United States Patent
Beutler et al.

(10) Patent No.: US 11,034,369 B2
(45) Date of Patent: Jun. 15, 2021

(54) TRANSPORT MEANS FOR TRANSPORTING A TRANSPORT GOOD AND/OR A PERSON, METHOD OF OPERATING A TRANSPORT MEANS, AND TRANSPORT SYSTEM

(71) Applicant: AUDI AG, Ingolstadt (DE)

(72) Inventors: Stephan Beutler, Ingolstadt (DE); Maximilian Ertl, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/360,291

(22) Filed: Mar. 21, 2019

(65) Prior Publication Data
US 2019/0291762 A1 Sep. 26, 2019

(30) Foreign Application Priority Data
Mar. 22, 2018 (DE) ...................... 10 2018 204 383.3

(51) Int. Cl.
*B62B 3/02* (2006.01)
*B62B 5/00* (2006.01)
(Continued)

(52) U.S. Cl.
CPC .................. *B62B 3/02* (2013.01); *B62B 5/00* (2013.01); *B62J 7/00* (2013.01); *B62K 3/002* (2013.01);
(Continued)

(58) Field of Classification Search
CPC ..................................... B62B 3/02; B62B 5/00
See application file for complete search history.

(56) References Cited

U.S. PATENT DOCUMENTS 3,659,865 A * 5/1972 Nothacker ........... B60N 2/2839
280/7.1
4,044,482 A 8/1977 Mosch
(Continued)

FOREIGN PATENT DOCUMENTS

CN 103587618 B 12/2015
DE 197 11 042 A1 9/1998
(Continued)

OTHER PUBLICATIONS

European Search Report dated Jul. 29, 2019, in corresponding European patent application No. 19161471.8 including partial machine-generated English language translation; 10 pages.
(Continued)

*Primary Examiner* — John D Walters
*Assistant Examiner* — James J Triggs
(74) *Attorney, Agent, or Firm* — Maier & Maier, PLLC

(57) ABSTRACT

A transport for transporting a transport good and/or a person. Therein, a storage space formed in a body of the transport for receiving the transport good as well as a standing and/or seating surface for the person are provided, wherein a cover is displaceable with respect to the body and/or the storage space, which closes the storage space in a first position and exposes it in a second position, wherein the cover has a retaining mechanism for the person, which is disposed above the standing and/or seating surface in the second position for retaining the person. The disclosure also relates to a method of operating a transport means as well as a transport system having multiple transport means movable independently of each other.

6 Claims, 1 Drawing Sheet

(51) Int. Cl.
  *B62K 15/00* (2006.01)
  *B62J 7/00* (2006.01)
  *B62K 3/00* (2006.01)
  *B62K 7/04* (2006.01)

(52) U.S. Cl.
  CPC .............. *B62K 7/04* (2013.01); *B62K 15/006* (2013.01); *B62B 2202/24* (2013.01)

(56) References Cited

U.S. PATENT DOCUMENTS

| | | | |
|---|---|---|---|
| 4,795,186 A * | 1/1989 | Tyus | B62B 3/02 280/37 |
| 5,106,141 A | 4/1992 | Mostashari | |
| 7,325,497 B2 | 2/2008 | Ben-Ezra | |
| 8,317,252 B2 | 11/2012 | Kimmet | |
| 9,302,728 B1 | 4/2016 | Yang | |
| 9,790,729 B2 | 10/2017 | Bradley et al. | |
| 2003/0094315 A1* | 5/2003 | White | B60L 8/00 180/2.2 |
| 2016/0068177 A1* | 3/2016 | Coyle | B62B 3/027 280/30 |
| 2018/0037288 A1 | 2/2018 | Bang et al. | |

FOREIGN PATENT DOCUMENTS

| | | |
|---|---|---|
| DE | 10 2008 048 741 A1 | 4/2010 |
| DE | 10 2009 050 331 A1 | 4/2011 |
| DE | 20 2014 009 999 U1 | 6/2015 |
| EP | 0 923 768 B1 | 7/2002 |
| WO | 2005/051762 | 6/2005 |
| WO | 2015/161237 A1 | 10/2015 |
| WO | 2016/184607 A1 | 11/2016 |
| WO | 2018/013094 A1 | 1/2018 |
| WO | 2018/017053 A1 | 1/2018 |

OTHER PUBLICATIONS

Examination Report dated Feb. 22, 2019 of corresponding German application No. 10 2018 204 383.3; 12 pages.

European Examination Report dated Nov. 19, 2020, in connection with corresponding EP Application No. 19 161 471.8 (12 pp., including machine-generated English translation).

* cited by examiner

TRANSPORT MEANS FOR TRANSPORTING A TRANSPORT GOOD AND/OR A PERSON, METHOD OF OPERATING A TRANSPORT MEANS, AND TRANSPORT SYSTEM

FIELD

The disclosure relates to a transport means for transporting a transport good and/or a person as well as a method of operating a transport means, and a transport system.

BACKGROUND

As an example, publication DE 10 2009 050 331 A1 is known from the prior art. It relates to a transport system for handling baggage items in the baggage processing at airports, wherein the baggage items are transported in areas between check-in and the aircraft. For transporting the baggage items at least over a partial route area, it is proposed to provide floor-bound, automatically controlled and guided, steerable carrier vehicles having an integrated drive, on which one baggage item lying thereon, respectively, is transportable to a determined destination.

SUMMARY

An object of the invention is to propose a transport means for transporting a transport good and/or a person, which allows for a very flexible use.

This is achieved with a transport means for transporting a transport good and/or a person having the features of the disclosure. It is characterized by a storage space formed in a body of the transport means for receiving the transport good as well as a standing and/or seating surface for the person, wherein a cover is displaceable with respect to the body and/or the storage space, which closes the storage space in a first position and exposes it in a second position, wherein the cover has a retaining means for the person, which is disposed above the standing and/or seating surface in the second position for retaining the person.

The transport means is, for example, part of a transport system, comprising a plurality of transport means. At least one of the transport means of the transport system, but preferably all transport means of the transport system, are designed according to what is shown in this specification. Thus, where the transport means or the at least one transport means is mentioned in this specification, the statements are always applicable to further transport means or all transport means of the transport system. The transport system provides the transport means to a user, i.e., the person, at least temporarily, preferably only temporarily, or permanently. However, the transport means is preferably always associated with the transport system and is not owned by the user. Basically, the transport means is used for transporting a load. Said load takes the form of the transport good and/or the person.

Preferably, the transport system has a plurality of transport means. The transport means may generally be different from one another or be at least partially or entirely identical in construction. It is particularly preferred for each of the transport means to be movable independently of any other one of the transport means. This means, in particular, that each of the transport means is operable in a completely autonomous manner, i.e., drives or can drive autonomously and automatically to a transport location and/or transport destination assigned to it, for example. For this purpose, the transport means is or are designed correspondingly, i.e., has/have means for performing an autonomous or independent driving operation, for example. In particular, such means may comprise a navigation device, a route planning device, an environment recognition device and/or the like.

The transport means is preferably free of emissions, i.e., produces no or virtually no exhaust gases during operation. As an example, this is ensured by a purely electric operation of the transport means. In this respect, it is particularly preferred for the transport means to include an electric machine as a driving means as well as a corresponding energy storage for the electric energy required to power the driving means. Additional requirements for the transport means may arise from safety regulations to be respected at the place of operation, if applicable, in particular if the transport means is to be operable in the public realm, for example on public roads.

The transport means includes the body in which the storage space is formed. The body may take the form of a housing incorporating the storage space. However, it may also refer to the construction and/or chassis of the transport means. The storage space is used for receiving the transport good. As an example, the transport good takes the form of at least one baggage item, so that the storage space is provided and adapted to receive the at least one baggage item. For example, the dimensions of the storage space are adapted to common baggage items. In addition, the transport means includes the standing and/or seating surface which is preferably also formed on the body of the transport means and is used to accommodate the person. This is understood to mean that the person may stand or sit on the standing and/or seating surface. In the former case, a design of the standing and/or seating surface is implemented as a pure standing surface, and in the latter case as a pure seating surface.

Furthermore, the transport means includes the cover which is displaceable, e.g., linearly displaceable and/or pivotably displaceable, with respect to the body and/or the storage space. The cover is positionable in at least two positions, namely in the first position and the second position. In the first position, the cover is disposed to close the storage space, preventing external access to the storage space through the cover. In the second position, on the other hand, the cover exposes the storage space, so that free access to the storage space as well as the transport good disposed therein is possible or enabled.

Preferably, the displacement of the cover is accomplished by means of a suitable drive, for example an electromotive drive. However, the cover may also be adapted to be manually displaced by the person. It is particularly preferred that at least one latch is associated with the cover, which is used to lock the cover with respect to the body and/or the storage space in the first position and/or the second position. Therefore, while the cover is locked by means of the latch, it is continuously held in the currently applicable position, i.e., the first position or the second position, for example. In order to displace the cover with respect to the body and/or the storage space form this position, the cover must first be unlocked, namely by adjusting the latch accordingly. It is particularly preferred to provide the latch if the cover is manually displaceable by the person to prevent unauthorized opening of the storage space or a displacement of the cover into the second position.

The cover includes the retaining means for the person, which is disposed above the standing and/or seating surface in the second position. The disposition of the retaining means in the second position is such that the person is retained, or it is, more generally, used to retain the person.

If the standing and/or seating surface is formed as a standing surface, the retaining means may be intended and adapted to be grasped by the person, for example, and may, for this purpose, be present in the form of a handle, as an example. Hence, during driving operation of the transport means, the person may hold on to the retaining means or handle while standing on the standing surface. When the standing and/or seating surface is designed as a seating surface, the retaining means may encompass at least sections of or the entire seating surface, for example, reliably preventing the person from falling off the transport means. Preferably, the retaining means also includes at least one armrest for the person which the person may use for support while sitting on the seating surface.

The transport means described allows for a very flexible use. For example, it may be used for transporting the transport goods alone from a transport location to a transport destination, in particular without the person. This ensures transport of the transport good to the transport destination occurring independently of the person, preferably a fully autonomous transport. For example, it may be contemplated that the person sets the transport destination at the transport means prior to transport at the transport location and the transport means then transports the transport good disposed in the storage space autonomously to the transport destination without involvement of the person. In this case, the cover is disposed in the first position during transport to prevent any unauthorized access to the transport good.

Likewise, the transport means may be used to transport the person only. For this purpose, the cover is displaced into the second position such that the person can hold on to the retaining means or is retained by it while standing or sitting on the standing and/or seating surface. However, during transport, the person may also carry the transport good along. For this purpose, the transport good may be disposed in the storage space prior to transport while the cover is in the second position. Thereafter, the person mounts the transport means and is transported together with their transport good to the transport destination.

Here, the cover remains in the second position during transport, i.e., at least until reaching the transport destination, so that the cover is used to retain the person. This means that the transport good or the storage space remain accessible from the outside during transport. However, this is unproblematic or even desired as the person accompanies their transport good. For example, the transport means may be employed at a train station, airport, mall or the like. For example, the transport means may be used to transport the transport good and/or the person between a parking lot, a stop or a train station, on the one hand, and a departure platform, a parking position of an aircraft or the like.

In a further design of the disclosure, the cover is pivotably mounted around a rotation axis with respect to the body and/or the storage space. In a particularly structurally simple manner, the pivotable mounting of the cover allows for closing the storage space in the first position, on the one hand, and correspondingly disposing the retaining means in the second position, on the other hand, so that the retaining means is disposed to retain the person. For example, the cover is pivotably mounted directly to the body. However, it may also be pivotably mounted to another element of the transport means, ultimately obtaining an indirect mounting of the cover to the body.

In a further preferred embodiment of the disclosure, the rotation axis of the cover coincides with the wheel axle of the transport means. The transport means includes at least the wheel axle, but preferably multiple wheel axles spaced apart from each other. Each wheel axle is preferably associated with multiple wheels of the transport means. For example, each wheel axle includes two wheels. The wheel axle or wheel axles are used to propel the transport means. Disposing the rotation axis of the cover such that it coincides with the wheel axle of the transport means enables a particularly compact rotatable mounting of the cover. For this purpose, the cover is rotatably mounted at the side of the wheels facing away from the body or, alternatively, between the body and the wheels, for example.

In a further development of the invention, the cover is rotatably mounted to a wheel hub associated with the wheel axle. The wheel hub is used to connect a wheel of the transport means to the wheel axle. Thus, as an example, the wheel hub is rigidly connected to the wheel axle and drivable by it. However, the wheel hub may also be equipped with a single-wheel drive of the transport means, i.e., be drivable independently of other wheel hubs of the wheel axle. In turn, the mounting of the cover to the wheel hub allows for the compact design already mentioned above.

Finally, in a further design of the invention, a screen is disposed at the cover, which is disposed above the standing and/or seating surface in the second position for use by the person. As an example, the screen is used to display at least one piece of information, wherein this piece of information may be understood to be a status of the transport means. It may also be contemplated to display advertising as the information. The screen is disposed at the cover such that it is visible, in particular fully visible, to the person in the second position. In other words, the screen should be usable by the person in the second position.

For example, it is intended for a screen area or display area of the screen to be disposed horizontally or upwards in the second position, whereas it is facing downwards, i.e., in the direction of a ground surface on which the transport means is disposed, in the first position. In other words, the screen is not usable by the person in the first position. Instead, it or its screen area is not readily visible to the person.

However, a design of the transport means may be contemplated in which the screen is visible to the person both in the first position and in the second position. As an example, the screen is then disposed such that, in the first position, it is present in such a manner that a person standing or moving next to the transport means can see the screen area. By contrast, in the second position, it is disposed such that the person on the standing and/or seating surface can see the screen area. The use of the screen enables the provision of information to the person in an easy manner and is intended for their entertainment during transport, for example.

The disclosure further relates to a method of operating a transport means for transporting a transport good and/or a person, in particular a transport means according to what is shown in this specification. In this respect, it is intended that the transport means has a storage space formed in a body of the transport means for receiving the transport good as well as a standing or seating surface for the person, wherein a cover can be displaced with respect to the body and/or the storage space, which closes the storage space in a first position and exposes it in a second position, wherein the cover has a retaining means for the person, which is disposed above the standing and/or the seating surface in the second position for retaining the person.

The advantages of such a design of the transport means or such a procedure have already been pointed out. Both the transport means and the method of operating the same may be developed further according to what is shown in this specification, so that reference is made thereto in this respect.

In a further preferred design of the invention, a mode of operation may be selected by the person at the transport means from a first mode of operation and a second mode of operation, and set at the transport means, wherein, in the first mode of operation, the cover is disposed in the first position and a driving operation of the transport means is performed for a transport location to a transport destination without the person, and, in the second mode of operation, the cover is disposed in the second position and the driving operation is performed from the transport location to the transport destination with the person on the standing and/or seating surface.

Hence, the transport means includes an input possibility for the selected mode of operation. The mode of operation is selectable by the person from the first mode of operation and the second mode of operation. In the first mode of operation, the cover is intended to be disposed in the first position during the driving operation, whereas, in the second mode of operation, the cover is disposed in the second position during the driving operation. This means that, in the first mode of operation, the transport means is used to transport the transport good only without being accompanied by the person. By contrast, in the second mode of transport, the transport good is accompanied by the person, or the transport means is at least prepared for such company.

For example, it is intended for the setting of the selected mode of operation to be made based on an occupancy of the standing and/or seating surface. For this purpose, the latter is provided with a corresponding sensor to determine the occupancy of the standing and/or seating surface. If it is determined, upon initiating the driving operation or during the driving operation, that the person is not on the standing and/or seating surface, the cover is disposed in the first position or displaced into the first position from the second position.

By contrast, if it is determined that the person is on the standing and/or seating surface, the cover is disposed or maintained in the second position. Basically, the driving operation should be understood to mean the transport of the transport good and/or the person from the transport location to the transport destination. In this respect, the driving operation applies as long as the transport means is on the route connecting the transport location with the transport destination. The procedure described allows for a very flexible use of the transport means.

In a further preferred design of the disclosure, it is intended, in the first mode of operation, that the storage space is maintained closed by means of the cover until the transport destination is reached and/or the person sets the cover to open at the transport means. In this respect, during the driving operation in the first mode of operation, the storage space is to remain closed so as to prevent unauthorized access to it or the transport good by means of the cover. The cover is maintained in the first position at least until the transport destination is reached. Additionally or alternatively, it may be intended for the cover to only be opened when the person makes a corresponding setting at the transport means. Thus, it is preferably intended that the cover is maintained closed even after reaching the transport destination, and that opening the cover is only possible by the person. This helps to achieve high security for the transport good with regard to theft.

Finally, in a further preferred procedure, it may be contemplated that a screen is disposed at the cover, which is deactivated in the first position and via which at least one piece of information is displayed in the second position. The screen is used to display the piece of information, such as at least one status of the transport means and/or advertising. For example, the screen is disposed at the cover such that it is only visible to the person in the second position, whereas the screen area of the screen is not visible to the person in the first position. Accordingly, the screen is fully deactivated in the first position. This applies in particular because it can be assumed anyway that the person is not on board the transport means or on the standing and/or seating surface while the cover is disposed in the first position. In the second position, by contrast, the person can be assumed to be present, so that the at least one piece of information, if available, is displayed by means of the screen.

The disclosure also relates to a transport system having multiple transport means which are movable independently of each other for transporting a transport good and/or a person, wherein at least one of the transport means is designed according to what is shown in this specification. Therein, a storage space formed in a body of at least one of the transport means for receiving the transport good as well as a standing and/or seating surface for the person are provided, wherein a cover is displaceable with respect to the body and/or the storage space, which closes the storage space in a first position and exposes it in a second position, wherein the cover has a retaining means for the person, which is disposed above the standing and/or seating surface in the second position for retaining the person.

Again, reference is made to what is shown in this specification with respect to advantageous further developments of the transport system, the transport means and the method of operating the transport means.

BRIEF DESCRIPTION OF THE DRAWINGS

In the following, the invention is explained in more detail by means of exemplary embodiments shown in the drawing, without limiting the invention. Therein.

DETAILED DESCRIPTION

Figure 1:
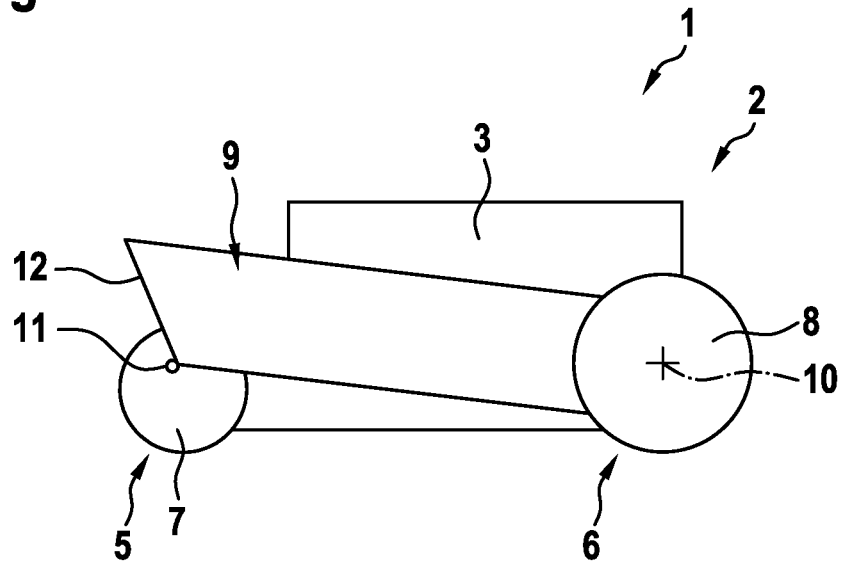
FIG. 1 shows a transport means, in particular a transport system, having a body in which a storage space is formed which is closed by a cover disposed in a first position.

FIG. 1 shows a schematic diagram of a transport means 1 which is part of a transport system, comprising a plurality of transport means 1, for example. Transport means 1 is used to transport a transport good and/or a person. It includes a body 2 in which a storage space 3 is formed for receiving the transport good. In addition, transport means 1 includes a standing and/or seating surface 4 for the person which is not visible here. Transport means 1 is designed as a multi-axle transport means 1, in particular as a two-axle transport means 1, and insofar includes multiple wheel axles 5 and 6. At each of the wheel axles 5 and 6, multiple wheels 7, 8 are disposed, respectively, which are used to drive transport means 1.

Transport means 1 also has a cover 9 which is displaceable, in the exemplary embodiment shown here, pivotably displaceable, with respect to body 2 and/or storage space 3. For this purpose, cover 9 is pivotably mounted to body 2 and/or storage space 3, namely, in particular, around a rotation axis 10, coinciding with wheel axle 6. In other words, cover 9 is rotatably mounted around the same rotation axis 10 as wheels 8. Preferably, for this purpose, cover 9 is rotatably mounted to a wheel hub (not shown) of wheel axle 6 or at least one of wheels 8. Cover 9 is shown in a first position in which it closes storage space 3, so that storage space 3 is not accessibly from an outside environment of transport means 1. Preferably, cover 9 fully closes storage space 3 in the first position.

A retaining means 11 may be present at cover 9, which is used to retain the person, preferably, however, only in a second position of cover 9 which is different from the first position. In addition, a screen 12 is disposed at cover 9, by means of which a piece of information can be displayed at least temporarily. As an example, the piece of information comprises a status of transport means 1 and/or advertising.

Figure 2:
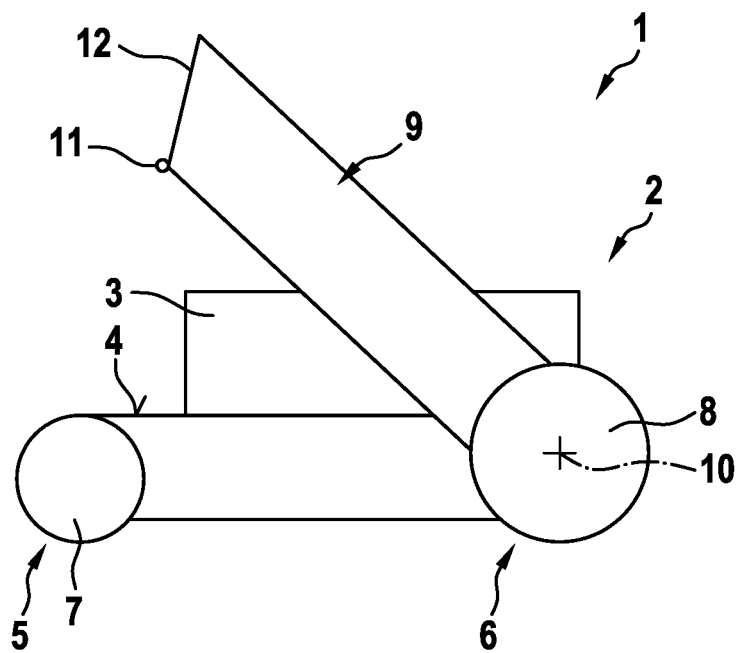
FIG. 2 shows a schematic diagram of the transport means, wherein the cover is disposed in a second position in which the storage space is exposed.

FIG. 2 shows a schematic diagram of transport means 1, wherein cover 9 is disposed in its second position. Therein, retaining means 11 is disposed above the standing and/or seating surface. By contrast, in the first position, retaining means 11 may be present underneath the standing and/or seating surface. In this respect, in the second position, retaining means 11 is disposed such that it is used for retaining the person. Here, the person on the standing and/or seating surface 4 can hold on to retaining means 11. As an example, for this purpose, retaining means 11 may take the form of a handle or the like. In the second position, the cover exposes storage space 3 so that any transport good present therein can be readily removed from it or placed into it.

The design of transport means 1 described allows for a very flexible use as it may either be used for transporting the transport good only, for transporting the person only or for transporting both the transport good and the person. In addition, thanks to the multifunctional use of cover 9 for closing storage space 3, on the one hand, and retaining the person, on the other hand, transport means 1 exhibits a very compact construction.

The invention claimed is:

1. A transport for transporting a transport good and/or a user, comprising:
   a storage space formed in a body of the transport for receiving the transport good,
   a standing and/or seating surface for the user which is separate from the storage space,
   a screen,
   wherein a cover is displaceable with respect to the body and/or the storage space, the cover closing the storage space in a first position and exposing the storage space in a second position,
   wherein the storage space and the cover are configured to enclose at least one baggage item when the cover is in the first position,
   wherein the cover has a retaining mechanism for the user, which is disposed above the standing and/or seating surface in the second position for retaining the user,
   wherein the cover is pivotably mounted around a rotation axis which coincides with a wheel axle of the transport,
   wherein the screen is disposed at the cover and provided above the standing and/or seating surface when the cover is in the second position,
   wherein the user may set a transport destination at the transport so that the transport may autonomously transport the transport good to the transport destination without the user while the cover is in the first position or the user to the transport destination with the user on the seating and/or standing surface while the cover is in the second position.

2. The transport as claimed in claim 1, wherein the cover is rotatably mounted to a wheel hub associated with the wheel axle.

3. A method of operating a transport comprising:
   selecting a mode of operation, by a user, at the transport, and
   transporting a transport good and/or the user via the transport,
   wherein the transport comprises a storage space formed in a body of the transport for receiving the transport good and a standing and/or seating surface for the user which is separate from the storage space,
   wherein a cover is displaceable with respect to the body and/or the storage space, the cover closing the storage space in a first position and exposing the storage space in a second position,
   wherein the storage space and the cover are configured to enclose at least one baggage item when the cover is in the first position,
   wherein the cover has a retaining means for the user, which is disposed above the standing and/or seating surface in the second position for retaining the user,
   wherein the cover is pivotably mounted around a rotation axis which coincides with a wheel axle of the transport,
   wherein the user selects between a first mode of operation and a second mode of operation,
   wherein, in the first mode of operation, the cover is disposed in the first position, the user sets a transport destination, and the transport drives from an origin to the transport destination autonomously and without the user,
   wherein, in the second mode of operation, the cover is disposed in the second position, the user sets the transport destination, and the transport drives from the origin to the transport destination autonomously with the user on the standing and/or seating surface.

4. The method as claimed in claim 3, wherein, in the first mode of operation, the storage space is maintained closed by means of the cover until the transport destination is reached and/or the user sets the cover to open at the transport.

5. The method as claimed in claim 3, wherein a screen is disposed at the cover, which is deactivated in the first position and via which at least one piece of information is displayed in the second position.

6. A transport system having a plurality of transports, the plurality of transports movable independently of each other,
   wherein each transport is provided for transporting a transport good and/or a user,
   wherein at least one of the transports comprise a storage space formed in a body of the at least one transports for receiving the transport good and a standing and/or seating surface for the user which is separate from the storage space,
   wherein a cover is displaceable with respect to the body and/or the storage space, the cover closing the storage space in a first position and exposing the storage space in a second position,
   wherein the storage space and the cover are configured to enclose at least one baggage item when the cover is in the first position,
   wherein the cover has a retaining means for the user, which is disposed above the standing and/or the seating surface in the second position for retaining the user,
   wherein the cover is pivotably mounted around a rotation axis which coincides with a wheel axle of the transport, wherein the user of one of the plurality of transports selects between a first mode of operation and a second mode of operation, wherein, in the first mode of operation, the cover of the one of the plurality of transports is disposed in the first position, the user sets a transport destination, and the one of the plurality of transports drives from an origin to the transport destination autonomously and without the user, wherein, in the second mode of operation, the cover of the one of the plurality of transports is disposed in the second position, the user sets the transport destination, and the one of the plurality of transports drives from the origin to the transport destination autonomously with the user on the standing and/or seating surface.

\* \* \* \* \*